United States Patent [19]

Maccise

[11] Patent Number: 4,474,303
[45] Date of Patent: Oct. 2, 1984

[54] PORTABLE MODULAR FOOD CONTAINER

[76] Inventor: Adiv Y. Maccise, Cerrada de Recursos Hidraulicos #20, Tlalnepantla, Mexico

[21] Appl. No.: 374,250

[22] Filed: May 3, 1982

[30] Foreign Application Priority Data

Aug. 28, 1981 [MX] Mexico .................. 188923

[51] Int. Cl.³ .................. B65D 6/02; B65D 21/02; B65D 41/06; A45C 11/20
[52] U.S. Cl. .................. 220/4 D; 220/94 A; 220/293; 220/294; 206/545
[58] Field of Search .................. 220/4 D, 94 A, 293, 220/294; 206/545

[56] References Cited

U.S. PATENT DOCUMENTS

| | | | |
|---|---|---|---|
| 909,238 | 1/1909 | Seely | 220/4 D |
| 2,595,113 | 4/1952 | Taberer | 220/4 D |
| 2,961,116 | 11/1960 | Jeppson | 220/421 |
| 3,067,896 | 11/1962 | Berg | 220/4 D |
| 3,207,359 | 9/1965 | Heisler | 220/94 A |
| 3,273,739 | 9/1966 | Wei | 220/4 D |
| 3,369,691 | 2/1968 | Wei | 220/4 D |
| 3,811,559 | 5/1974 | Carter | 220/4 D |
| 4,078,701 | 3/1978 | Clabb | 220/4 D |

FOREIGN PATENT DOCUMENTS

| | | | |
|---|---|---|---|
| 30376 | 9/1964 | German Democratic Rep. | 220/293 |
| 1357096 | 6/1974 | United Kingdom | 220/94 A |

Primary Examiner—George E. Lowrance
Attorney, Agent, or Firm—Schwartz, Jeffery, Schwaab, Mack, Blumenthal & Koch

[57] ABSTRACT

The portable modular food container has exchangeable units useful for preservation and transportation of food stuffs. Each unit is formed to connect to a lower unit and contains an inner cover which is pressed down by the unit above.

12 Claims, 4 Drawing Figures

PORTABLE MODULAR FOOD CONTAINER

BACKGROUND OF THE INVENTION

The present invention relates to containers for conserving and carrying domestic food.

The types and models of food containers are varied in their design and materials of manufacture. The present invention is directed toward the general construction of said containers by which individual portions of foodstuff may be carried without mixing them and may also be contained in such a manner that spillage is avoided.

The majority of the food containers are basically composed of a series of containers disposed one over the other. The containers are held in position by rods through which holding flanges of the containers pass, so that when in position the whole assembly may be easily carried. However, the transportation of the already known types of multiple food containers is not a safe one, because the assembled unit is liable to easily disassemble during transportation causing the contents to spill. Likewise, the temperatures of the contents normally reaches that of the surroundings because the assembly lacks insulating means such as the insulating chamber of the present invention.

In the present invention, the temperature of the contents, which are generally foodstuffs, is held at a preselected value. This is achieved by the fact that the various units are sealed when they are assembled, which is possible because, in addition to the sealing of the individual units of the assembly, an insulating air chamber is provided in their walls.

SUMMARY OF THE INVENTION

It is therefore an object of the present invention to provide an improved modular food container by which it is possible to carry small portions of any type of food in a safe condition avoiding spillage, while at the same time keeping the food under thermal conditions whereby it is possible to preserve the basic food characteristics whether they are dry or moist or whether they are in a solid or liquid state.

Another object of the present invention is to provide an improved modular food container in which it is possible to seal the containers by manual operation which facilitates the foodstuff transportation.

Another object of the present invention is to provide an improved modular food container, by which the conservation of constant temperature lets the consistency and characteristics of the food be better conserved.

A further object of the present invention is to provide an improved modular food container which, because of its integrated construction as well as of the pivotal character of its handles, can be stored without occupying excessive space and can be converted easily for transportation since it is manually transported most of the time.

The present invention relates to improvements in modular food containers basically comprising a series of containers. Each container is formed as a unit having an inner storage body and an exterior body. The interior and exterior bodies of each unit are integrated into a single piece such that an empty space is left therebetween which forms an air chamber whereby the temperature within the inner body is maintained substantially constant.

The above-mentioned air chamber may optionally be filled with an insulating material. In the upper part of each container unit there is a flange that extends peripherally around the container and which folds inwardly to form four separate inner grooves which are evenly distributed. The bottom of the container is sealed with a laminar flat element having a peripheral shape the same as that of the container. The lower part of the laminar flat element contains four uniformly distributed radially protruding tongues of a length similar to the depth of the grooves formed by the folded portions of the upper flange of the container. Thus, the tongues on the lower part of one container may be fit into the grooves of the upper part of a lower container.

The above described combination of tongues and grooves permits the assembly of the whole container by placing the various units one above the other and holding them in place by engaging the tongues of the upper unit with the grooves of a lower unit. As many or as few units as may be convenient or desired may be connected in this manner. Moreover, there is a flat element or cover that is placed over the container unit occupying the top position. The cover contains four tongues that are equally located around the cover bottom part, and which are capable of being inserted into the grooves of the top container unit.

Both, in the containers, as well as in the cover, there are vertically disposed alternating protruding flat areas which shape the body or external face thereof so that it is possible to grab the container manually in order to easily assemble or disassemble the multiple unit modular food container.

In addition, in the upper portion of the container cover there are rotatable holders which, when they rotate 90°, become concealed in a predisposed channel groove in the uppermost cover whereby the space required for storing the food container is reduced.

On the other hand, when the food container is going to be carried, the holders are rotated 90° in the opposite direction from one another so that they attain a vertical position whereby the whole unit is easily transported.

BRIEF DESCRIPTION OF THE DRAWINGS

The present invention will now be described in terms of a particular preferred embodiment in reference to the accompanying drawings.

DETAILED DESCRIPTION OF THE PREFERRED EMBODIMENT

Figure 1:
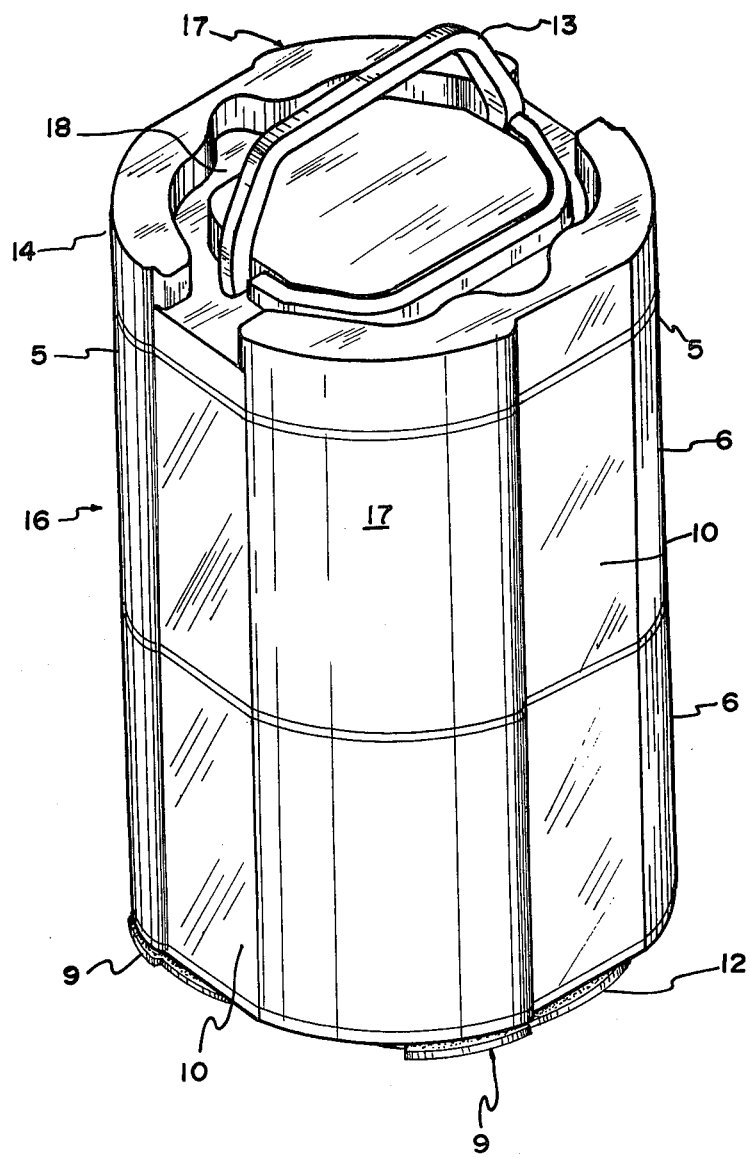
FIG. 1 is a perspective view of the present invention.

With reference to the figures, FIG. 1 shows an embodiment of the food container of the invention 16 that is formed by two modular container units 6 and an upper external cover 14. Each container unit 6 and upper cover 14 has an outer face 5 shaped by protrusions 17 and flat areas 10 which facilitate manual grasping of the unit with the purpose of separating or disassembling its different components. Also, in the cover 14, there are handles 13 that are pivotally rotatable and that can be moved to a storage position in a groove 18 for protection and for reducing the storage space for the container. In other words, these handles can be rotated to an upright position for carrying the whole assembled unit, or can be laid into groove 18 for storage.

Each container unit 6 is composed of an inner body 15 (see FIGS. 1 and 2), and an outer body 5. A peripheral shoulder or upper crown 19 separates the inner body 15 and outer body 5 respectively, thereby forming an insulating thermal chamber 20, which is particularly important since it maintains the contents of inner body 15 at a substantially constant temperature which is generally the original temperature at which the contents were before they were placed inside the container. For this purpose also, the insulating chamber 20 may be either evacuated, or else, it may receive insulating materials such as polyurethane or some other kind of plastic foam such as, for example, styrene foam or other materials having similar properties. The upper crown 19 is connected to a flange 11 which bends in at four positions to form four grooves 8 in which the tongues 9 of another container unit 6 can engage. Indeed, in order to assemble the two modular containers of the embodiment shown, the upper module 6 is placed over the other lower module 6 in such a manner that tongues 9 of module 6 are placed approximately halfway between grooves 8, whereupon the two modules are rotated in opposite directions with respect to one another so that tongues 9 are inserted in the grooves 8. In the same manner module 6 and upper cover 14 are coupled. In order to achieve a better sealing between each container 6 or between container 6 and the cover 14, an inner substantially flat cover 7 covering the top of inner body 15 of the container is laid flat on the peripheral shoulder or upper crown 19. As observed in FIG. 2, the annular flange 7a of the flat cover 7 will lie on shoulder 19 while rim 7b of the cover 7 will fit snugly to seal the top of body 15 which is covered by laminar section 7c.

Inner cover 7 is pressed down by the element that is placed immediately above it whether it is a modular container unit 6 or the upper cover 14, thereby ensuring that the contents of the body 15, which is generally food, is substantially conserved at the temperature at which it was when deposited.

Figure 2:
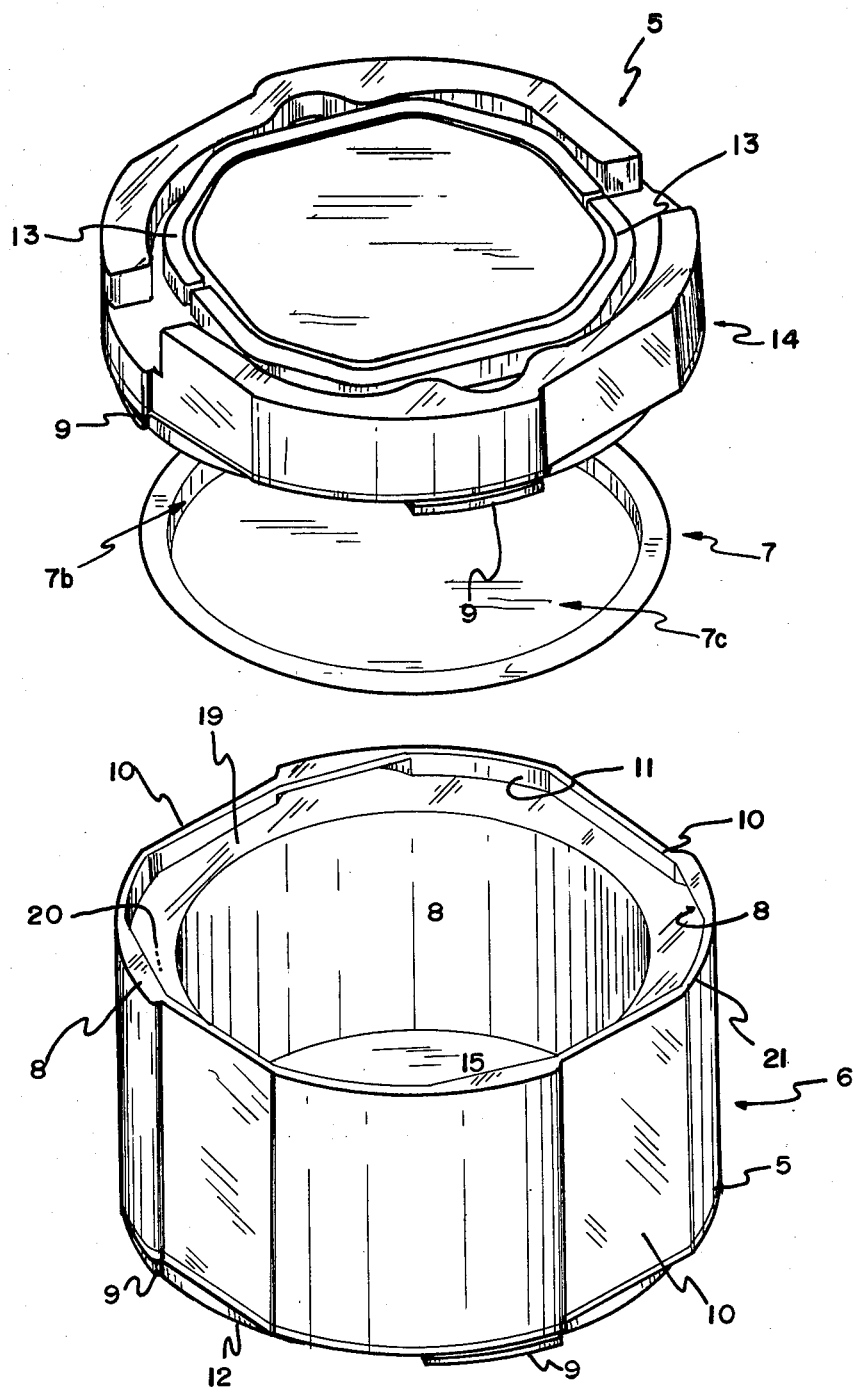
FIG. 2 is an exploded isometric view of one of the units of the container of the invention showing the inner and the outermost upper cover.

Finally, FIG. 2 shows the external configuration of modular unit 6 of the food container 16, which is shaped to facilitate handling during assembling and disassembling operations. The shape consists of protrusions 17 and flat sections 10.

Figure 3:
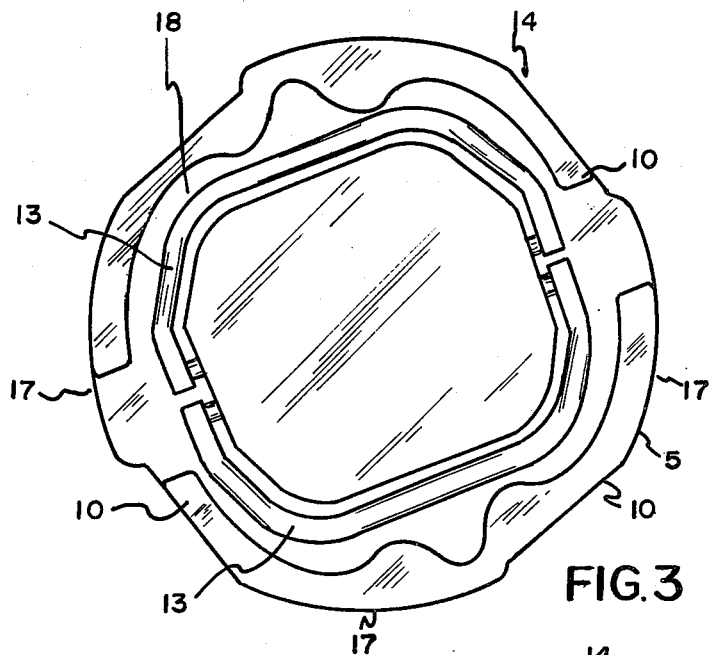
FIG. 3 shows a plan view of the uppermost cover of the invention.
Figure 4:
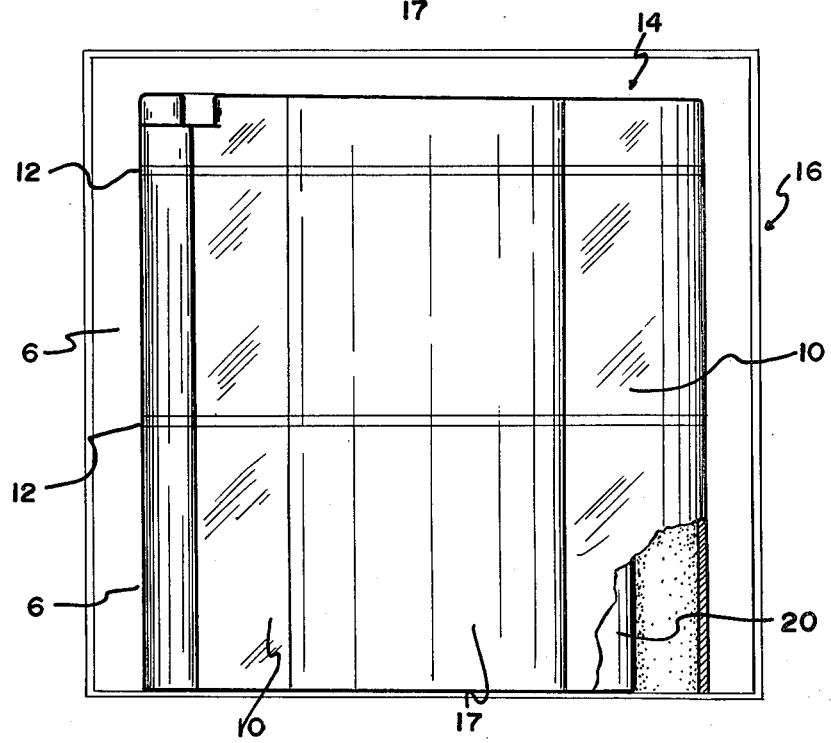
FIG. 4 shows an elevational view of one of the lower units of the invention.

Also, a reduction in the space required for storage is achieved by the present invention since food container 16 has arch shaped handles 13, which rotate pivotally 90° for storage within channel groove 18. In this manner, the whole container can be stored as shown in FIGS. 3 and 4, wherein handles 13 do not occupy any space above the top of the stored container.

It is considered to be manifest, however, that many modifications and variations to the disclosed invention may be made without departing from the spirit and scope thereof.

I claim:

1. Multiple modular food container assembly comprising:
   a plurality of individual container units, each of said individual container units comprising: a cylindrical wall forming an inner body; an outer body concentrically separated from said inner body, said outer body comprising an outer wall with alternating spaced flat portions and outwardly protruding portions to facilitate grasping; a shoulder bending outwardly from said inner body and sealingly joining said outer body; an annular flange formed by a portion of said outer wall extending upwardly from said shoulder, said annular flange having an upper edge folding inwardly from said outwardly protruding portions to form flange grooves defined by said inwardly folded upper edge and said outwardly protruding portions; a flat element enclosing the bottom of said unit, said flat element having alternating tongues, each of which has a rectangular periphery so shaped that it fits one of said flange grooves whereby tongues of one container unit can be inserted in flange grooves of another container unit when assembling the container units; and a substantially flat inner cover element removably covering said inner body; and
   an external cover having a top with a channel groove and a bottom sealing element with peripheral alternating tongues, and a pair of pivotally attached handles connected for movement between an upright position and a storage position in said channel groove, said external cover having alternating flat portions and outwardly protruding portions which align with said flat portions and outwardly protruding portions of said container when said food container is assembled.

2. The multiple container assembly according to claim 1, wherein the separation between the cylindrical wall forming the inner body and the outer body 5 comprises an insulating chamber.

3. The container assembly according to claim 2, wherein said insulating chamber is under vacuum.

4. The container assembly according to claim 2, wherein said chamber is filled with foamed insulating material.

5. The multiple container assembly according to claim 1, wherein the inner cover element comprises an annular flange, a flat circular section, and a rim connecting said annular flange to said circular section.

6. The multiple container assembly according to claim 5, wherein said inner cover element is disposed over said inner body, said annular flange resting on said shoulder and said rim having an exterior surface snugly fitting an upper circular surface of said cylindrical wall.

7. The multiple container assembly according to claim 1, wherein the shoulder of a lower unit is wide enough to receive the tongues of an upper unit in an area between the flange grooves of the lower unit such that assembly of a lower and an upper unit can be carried out by first placing the upper unit so that its tongues rest on the shoulder of the lower unit but between the flange grooves of the lower unit and rotating the upper and lower units in opposite directions with respect to each other whereby the tongues of the upper unit become lodged within the flange grooves of the lower unit.

8. The multiple container assembly according to claim 1, wherein the shoulder of an upper unit is wide enough to receive the tongues of said external cover in an area between the flange grooves of said upper unit such that assembly can be carried out by resting the tongues of said external cover on the shoulder of said upper unit between the flange grooves of said upper unit and rotating the external cover and upper unit opposite to one another whereby the tongues of the external cover become lodged inside the flange grooves of the upper unit.

9. The multiple container assembly according to claim 6, wherein said inner cover of a lower unit is pressed into place during assembly by an upper unit when the tongues of the upper unit are received in the flange grooves of the lower unit.

10. The multiple container assembly according to claim 6, wherein the inner cover of an upper unit is pressed into place during assembly by said external cover when the tongues of said external cover are received in the flange grooves of the upper unit.

11. The multiple container assembly according to claim 1, wherein said pair of handles are arch shaped and are capable of being pivotally rotated in opposite directions to occupy opposed horizontal positions within said channel groove of said cover so that the whole assembly is stored without said handles occupying any space above said external cover.

12. The multiple container assembly according to claim 11, wherein said arch shaped handles are capable of being pivotally rotated upwardly toward each other from their horizontal positions unitl they meet each other so that the whole assembly may be either carried or hung while said handles are in a vertical position normal to the horizontal.

* * * * *